United States Patent
Sato

(10) Patent No.: US 12,392,797 B2
(45) Date of Patent: Aug. 19, 2025

(54) INERTIAL MEASUREMENT DEVICE AND SELF-DIAGNOSIS METHOD OF INERTIAL MEASUREMENT DEVICE

(71) Applicant: SEIKO EPSON CORPORATION, Tokyo (JP)

(72) Inventor: Kenta Sato, Shiojiri (JP)

(73) Assignee: SEIKO EPSON CORPORATION (JP)

( * ) Notice: Subject to any disclaimer, the term of this patent is extended or adjusted under 35 U.S.C. 154(b) by 293 days.

(21) Appl. No.: 18/324,253

(22) Filed: May 26, 2023

(65) Prior Publication Data

US 2023/0384345 A1 Nov. 30, 2023

(30) Foreign Application Priority Data

May 30, 2022 (JP) .................. 2022-087476

(51) Int. Cl.
*G01P 21/00* (2006.01)
*G01P 1/02* (2006.01)
*G01P 15/097* (2006.01)

(52) U.S. Cl.
CPC .............. *G01P 21/00* (2013.01); *G01P 1/023* (2013.01); *G01P 15/097* (2013.01)

(58) Field of Classification Search
CPC ........ G01P 21/00; G01P 1/023; G01P 15/097; G01P 2015/0828; G01P 2015/0837; G01P 21/02
USPC ........................................ 73/1.34, 1.38, 1.82
See application file for complete search history.

(56) References Cited

FOREIGN PATENT DOCUMENTS

| CA | 3062571 A1 | * | 6/2020 | ............ B23B 49/00 |
|---|---|---|---|---|
| JP | 2005-127890 A | | 5/2005 | |
| KR | 20200082395 A | * | 7/2020 | |

* cited by examiner

*Primary Examiner* — Robert R Raevis
(74) *Attorney, Agent, or Firm* — Harness, Dickey & Pierce, P.L.C.

(57) ABSTRACT

An inertial measurement device includes a first inertial sensor having a first detection axis, a second inertial sensor having a second detection axis defined in a direction opposite to the first detection axis, and a processing circuit configured to execute self-diagnosis based on whether a ratio of an amplitude of an output of the first inertial sensor to an amplitude of an output of the second inertial sensor is within a reference range.

7 Claims, 10 Drawing Sheets

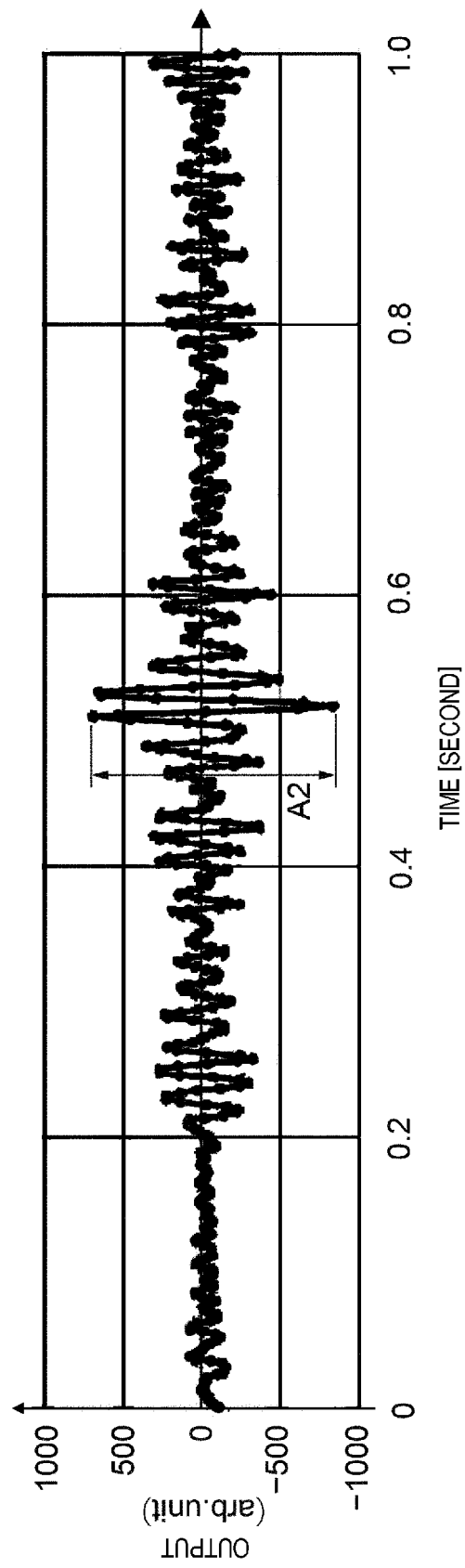

INERTIAL MEASUREMENT DEVICE AND SELF-DIAGNOSIS METHOD OF INERTIAL MEASUREMENT DEVICE

The present application is based on, and claims priority from JP Application Serial Number 2022-087476, filed May 30, 2022, the disclosure of which is hereby incorporated by reference herein in its entirety.

BACKGROUND

1. Technical Field

The present disclosure relates to an inertial measurement device and a self-diagnosis method of an inertial measurement device.

2. Related Art

JP-A-2005-127890 discloses a technique in which, in an electrostatic capacitance detection type acceleration sensor, an electrostatic force is applied between a self-diagnosis electrode provided in a diaphragm outer frame and an electrode provided on a weight body so as to change an electrostatic capacitance between a diaphragm and a detection electrode and perform self-diagnosis by detecting the change in the electrostatic capacitance.

In the technique disclosed in JP-A-2005-127890, it is necessary to apply a voltage to the self-diagnosis electrode in order to displace the weight body. In such a technique, accuracy of self-diagnosis may decrease due to the self-diagnosis electrode and a configuration necessary for the self-diagnosis electrode.

SUMMARY

An inertial measurement device includes: a first inertial sensor having a first detection axis; a second inertial sensor having a second detection axis defined in a direction opposite to the first detection axis; and a processing circuit configured to execute self-diagnosis based on whether a ratio of an amplitude of an output of the first inertial sensor to an amplitude of an output of the second inertial sensor is within a reference range.

In a self-diagnosis method of an inertial measurement device including a first inertial sensor having a first detection axis, a second inertial sensor having a second detection axis defined in a direction opposite to the first detection axis, and a processing circuit configured to acquire an output of the first inertial sensor and an output of the second inertial sensor, the processing circuit executes self-diagnosis based on whether a ratio of an amplitude of the output of the first inertial sensor to an amplitude of the output of the second inertial sensor is within a reference range.

BRIEF DESCRIPTION OF THE DRAWINGS

FIG. 9B shows an example of a waveform of measurement data of a second inertial sensor.

DESCRIPTION OF EXEMPLARY EMBODIMENTS

Figure 6:
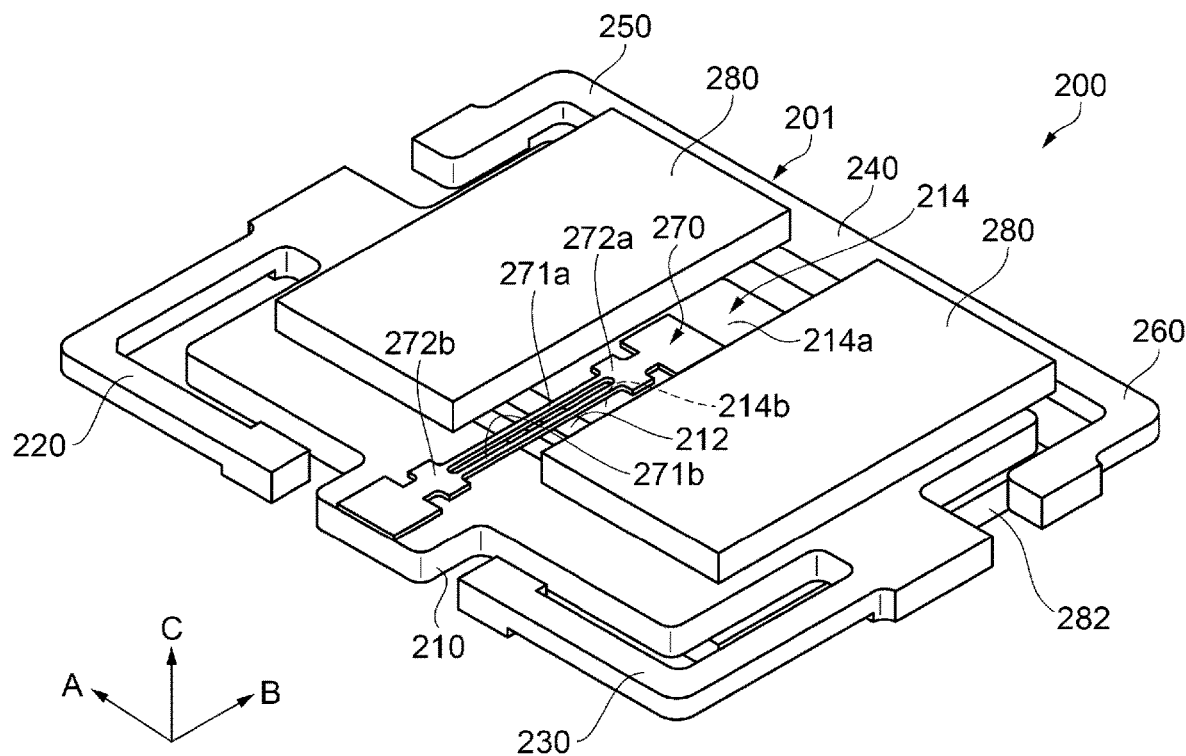
FIG. 6 is a perspective view of a sensor element.
Figure 7:
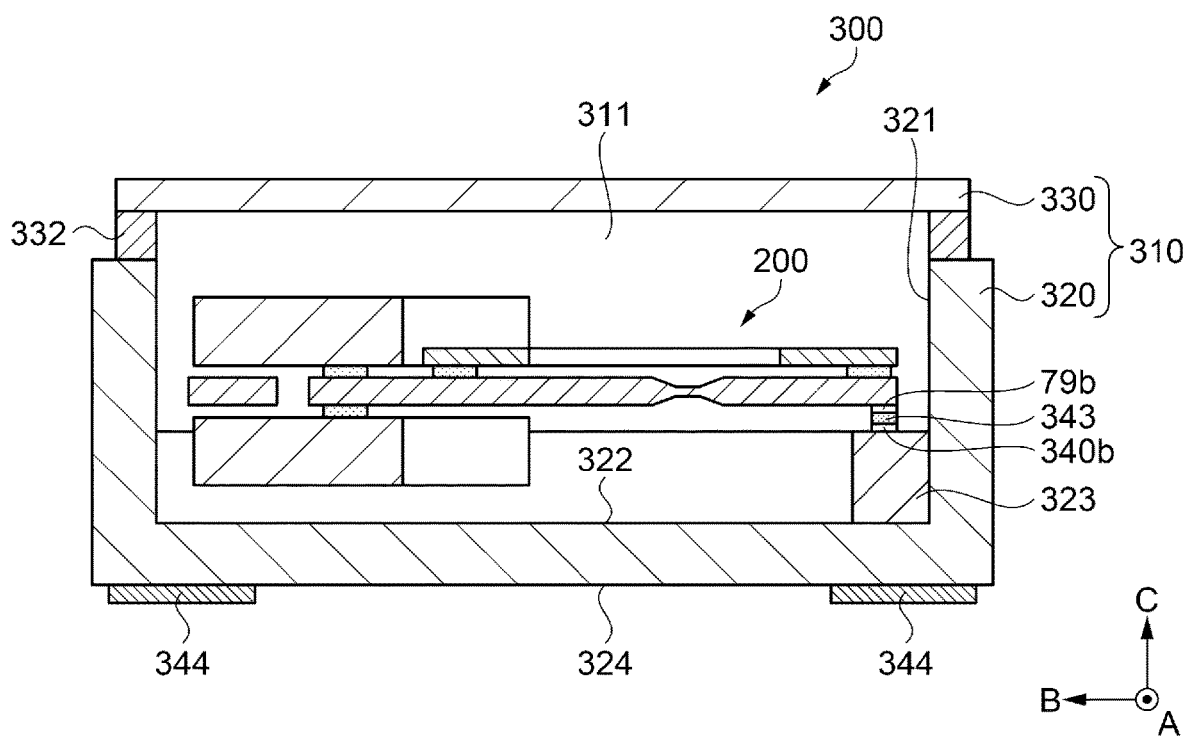
FIG. 7 is a cross-sectional view of an inertial sensor using the sensor element.

Hereinafter, embodiments of the present disclosure will be described with reference to the drawings. For convenience of description, in FIGS. 1 to 5 and 11, an X-axis, a Y-axis, and a Z-axis are shown as three axes orthogonal to each other. A coordinate system including the X-axis, the Y-axis, and the Z-axis is a reference coordinate system for describing an inertial measurement device 100 according to the present disclosure. In FIGS. 6 and 7, an A-axis, a B-axis, and a C-axis are shown as three axes orthogonal to each other. A coordinate system including the A-axis, the B-axis, and the C-axis is a local coordinate system for describing an inertial sensor 300 according to the present disclosure.

A direction along the X-axis is also referred to as an "X-axis direction", a direction along the Y-axis is also referred to as a "Y-axis direction", a direction along the Z-axis is also referred to as a "Z-axis direction", a direction along the A-axis is also referred to as an "A-axis direction", a direction along the B-axis is also referred to as a "B-axis direction", and a direction along the C-axis is also referred to as a "C-axis direction". In addition, for example, a Y direction refers to a direction toward an arrow tip side along the Y-axis, and a −Y direction refers to a direction toward an arrow base side along the Y-axis. The Y-axis direction refers to both the Y direction and the −Y direction.

In addition, a plan view seen from a Z direction may be simply referred to as a "plan view".

1. First Embodiment

The inertial measurement device 100 according to a first embodiment will be described with reference to FIGS. 1 to 8. First, a structure of the inertial measurement device 100 according to the first embodiment will be described with reference to FIGS. 1 to 5. The inertial measurement device 100 is a measurement device that measures a physical quantity by using inertia. In the embodiment, the inertial measurement device 100 measures an acceleration in the Y-axis direction as an example of the physical quantity. However, the physical quantity measured by the inertial measurement device 100 is not limited thereto.

Figure 1:
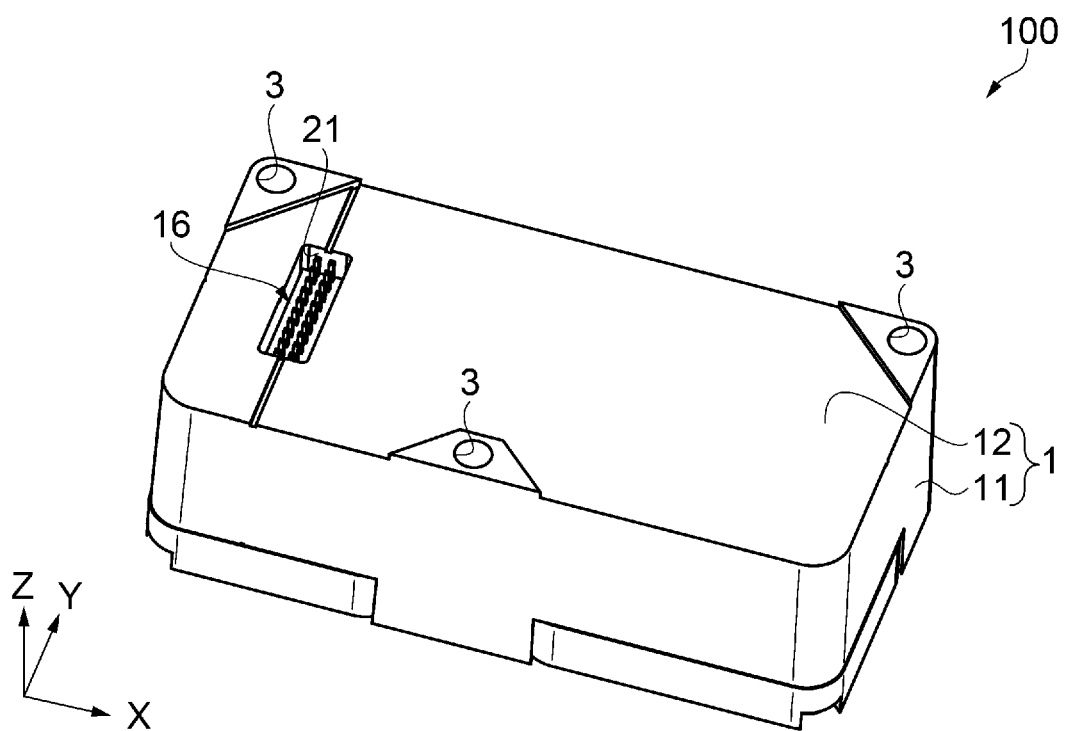
FIG. 1 is a perspective view of an inertial measurement device according to a first embodiment.

As shown in FIG. 1, an outer shape of the inertial measurement device 100 is generally a rectangular parallelepiped shape having sides along the X-axis, the Y-axis, and the Z-axis, respectively. The inertial measurement device 100 has a substantially rectangular shape defined by a long side along the X-axis and a short side along the Y-axis in the plan view. The inertial measurement device 100 includes three screw holes 3 formed in the vicinity of both end portions of one long side and the vicinity of a center portion of the other long side in the plan view. By passing fixing screws through the respective screw holes 3, the inertial measurement device 100 can be fixed to an attachment surface of an attachment target body. The inertial measurement device 100 is used in a state of being fixed to the attachment target body which is a vibration measurement target. The attachment target body is, for example, a structure such as a building or a bridge, or a moving body such as an automobile, a drone, or a robot.

The inertial measurement device 100 includes an opening portion 21 provided in a surface facing the Z direction. A connector 16 of a plug type is disposed inside the opening portion 21. The connector 16 includes a plurality of pins disposed in two rows, and the plurality of pins are arranged in the Y direction in each row. A connector (not shown) of a socket type is coupled to the connector 16. Through the connector 16, transmission and reception of a signal such as a drive voltage of the inertial measurement device 100 or a measured value output from the inertial measurement device 100 are performed between the inertial measurement device 100 and the attachment target body or a control device (not shown).

Figure 2:
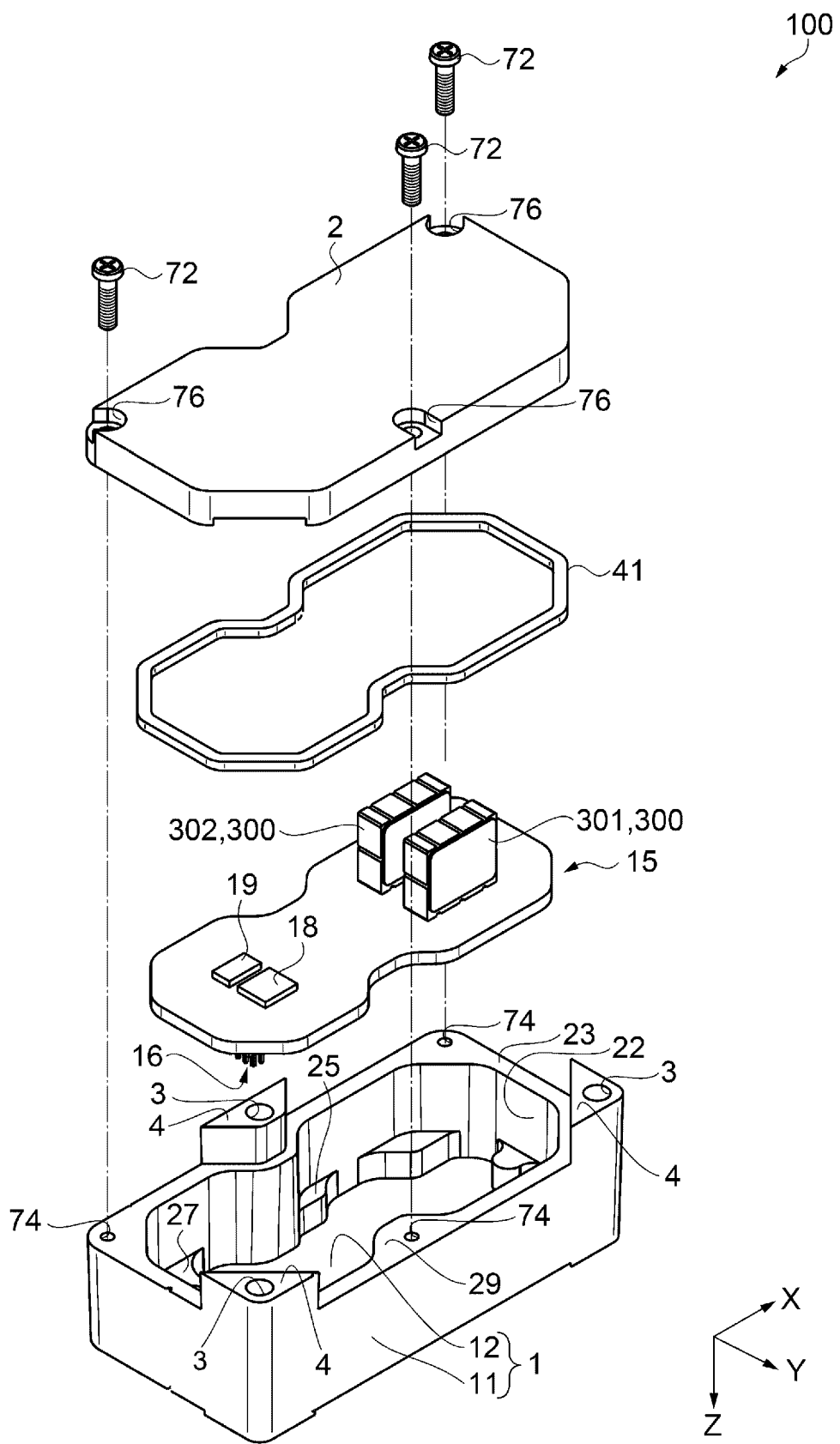
FIG. 2 is an exploded perspective view of the inertial measurement device.
Figure 3:
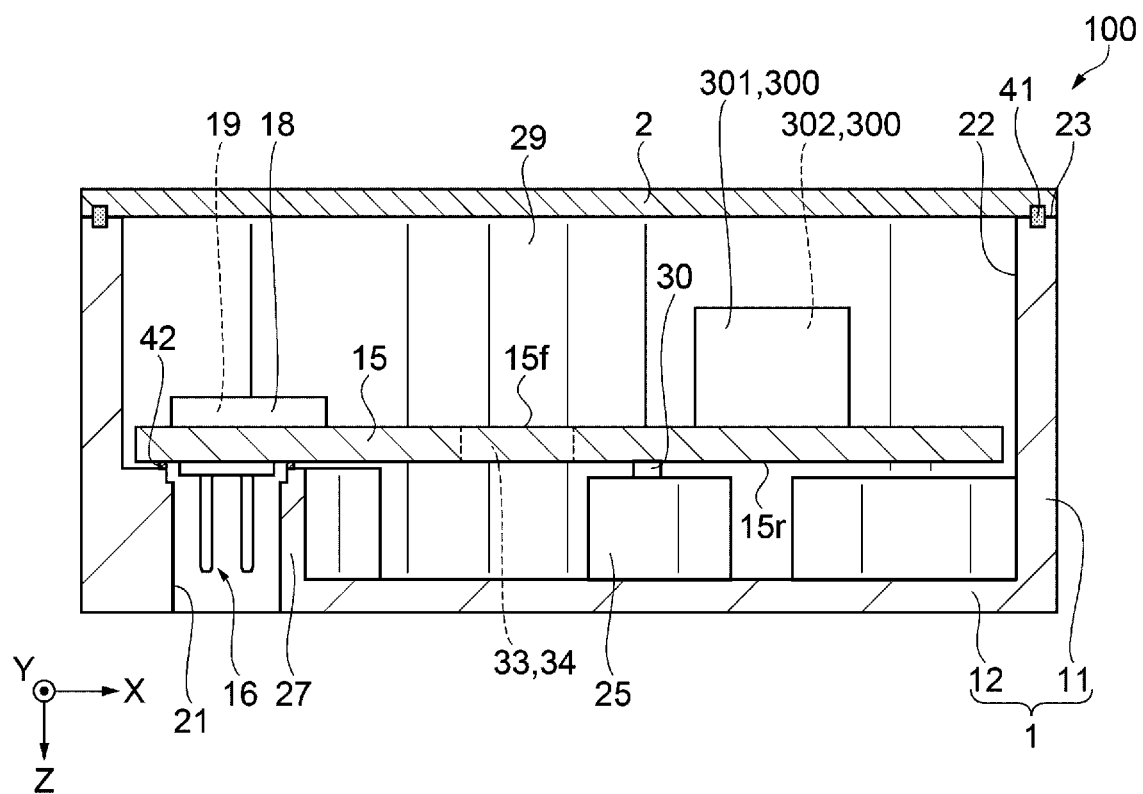
FIG. 3 is a cross-sectional view of the inertial measurement device.

As shown in FIGS. 2 and 3, the inertial measurement device 100 includes a container 1, a lid portion 2, a seal member 41, a circuit board 15, and the like. The circuit board 15 is a board in the present disclosure. Specifically, the circuit board 15 is attached to an inner side of the container 1 via fixing members 30 and 42. The lid portion 2 covers an opening of the container 1 via the seal member 41. The lid portion 2 is fixed, by a screw 72 inserted into a through hole 76 provided in the lid portion 2 and a female screw 74 provided in the container 1, to the container 1 via the seal member 41.

The container 1 accommodates the circuit board 15. The container 1 has a box shape opened toward a −Z direction. An outer shape of the container 1 is substantially a rectangular parallelepiped shape, and a metal material such as aluminum can be adopted as a material of the container 1 that forms a part of the outer shape of the inertial measurement device 100.

The container 1 includes a flat plate-shaped bottom portion 12 and a frame-shaped side wall 11 erected in the −Z direction from an outer peripheral portion of the bottom portion 12. Inside of the container 1 can be defined as a space surrounded by the bottom portion 12 and the side wall 11. The circuit board 15 is disposed such that an outer edge thereof extends along an inner surface 22 of the side wall 11. The lid portion 2 is fixed to an opening surface 23 so as to cover the opening of the container 1. The opening surface 23 coincides with an end surface of the side wall 11 on which the lid portion 2 is placed. On the opening surface 23, three fixed protruding portions 4 are erected in the vicinity of both end portions of one long side and the vicinity of a center portion of the other long side of the container 1 in the plan view. In addition, in the opening surface 23, three female screws 74 are provided in the vicinity of a center of the one long side and the vicinity of both end portions of the other long side of the container 1 in the plan view. The screw hole 3 is formed in each of the fixed protruding portions 4.

Figure 4:
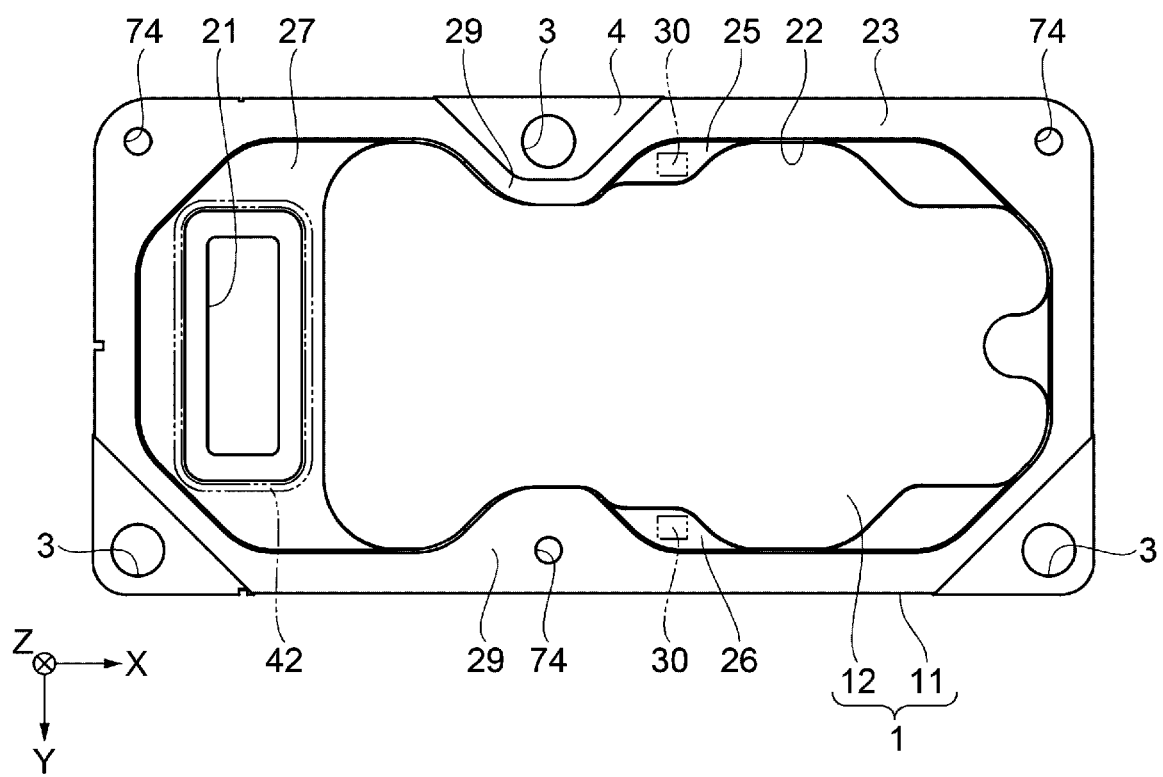
FIG. 4 is a plan view of a container.

In addition, as shown in FIGS. 3 and 4, the side wall 11 includes two protruding portions 29 each protruding inward in a ridge shape from the bottom portion 12 to the opening surface 23. The two protruding portions 29 are located in the vicinity of the center portion of the one long side and the vicinity of the center portion of the other long side of the container 1 in the plan view. The two protruding portions 29 correspond to constricted portions 33 and 34 of the circuit board 15 to be described later.

In addition, the container 1 includes a first pedestal 27 and second pedestals 25 and 26 protruding, in a stepped shape higher by one step, from the bottom portion 12 toward the opening surface 23. The first pedestal 27 is provided in a region including a region in which the connector 16 attached to the circuit board 15 is disposed in the plan view. The container 1 includes the opening portion 21 provided in the first pedestal 27 in the plan view. The opening portion 21 penetrates the inside and the outside of the container 1. The connector 16 is inserted into the opening portion 21.

The second pedestals 25 and 26 are located on a side opposite to the first pedestal 27 with respect to the two protruding portions 29. The first pedestal 27 and the second pedestals 25 and 26 function as pedestals for fixing the circuit board 15 to the container 1.

A planar shape of the outer shape of the container 1 is not limited to the rectangular shape and may be a polygonal shape such as a square shape, a hexagonal shape, or an octagonal shape. In addition, a corner of an apex portion of the polygon may be chamfered, or any one of sides of the polygon may have a curved planar shape. In addition, a planar shape of inside of the container 1 is not limited to the shape described above and may be another shape. In addition, planar shapes of the outer shape and the inside of the container 1 may be similar or may not be similar.

The circuit board 15 that serves as the board is a multilayer board in which a plurality of through holes and the like are formed. In the embodiment, a glass epoxy board is used as the circuit board 15. The circuit board 15 is not limited to the glass epoxy board, and a composite board or a ceramic board may be used.

Figure 5:
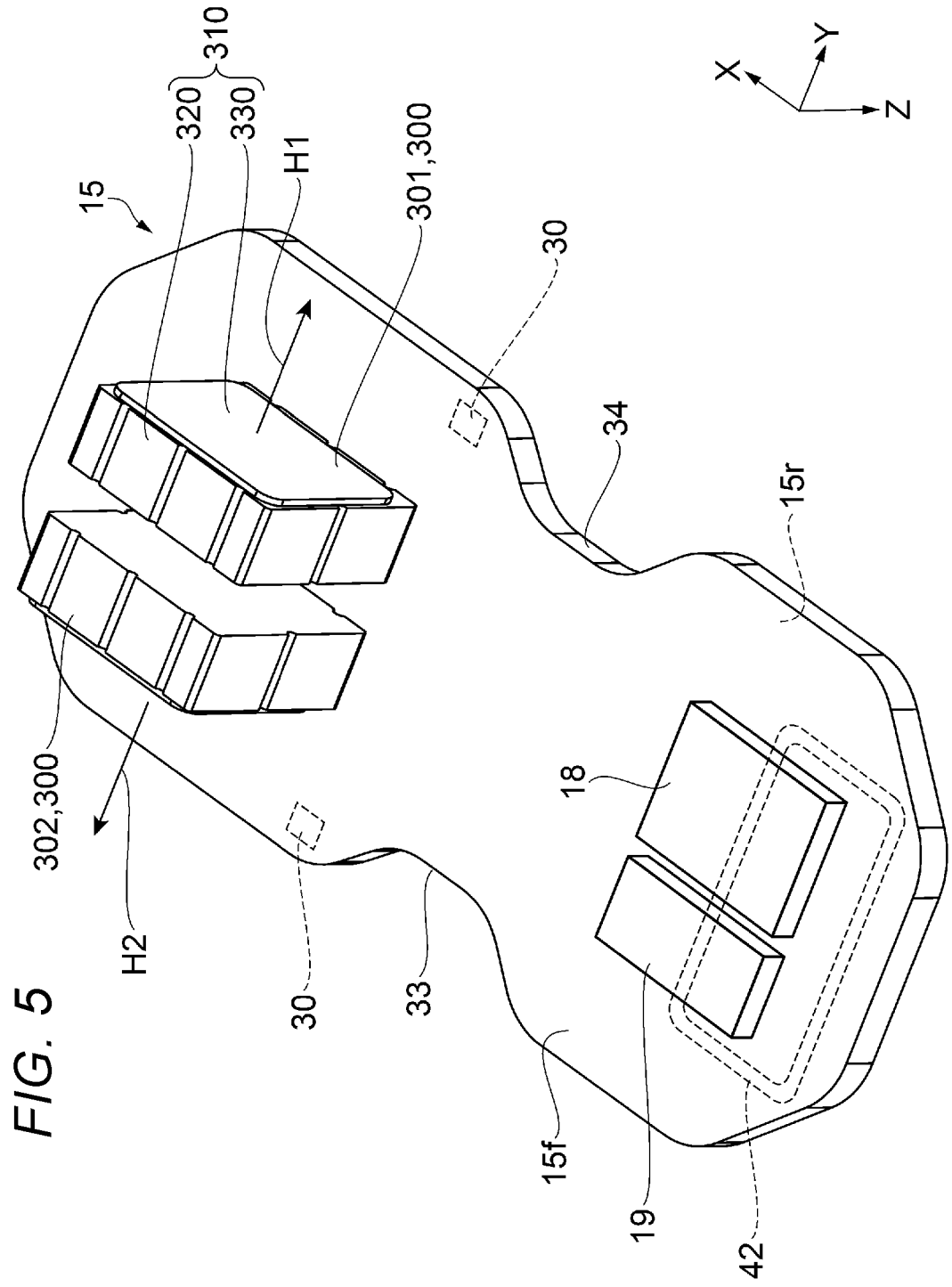
FIG. 5 is a perspective view of a circuit board.

As shown in FIGS. 3 and 5, the circuit board 15 has a flat plate shape having a first surface 15*f* and a second surface 15*r*, which are planes along the X direction and the Y direction, and a thickness along the Z direction. The first surface 15*f* and the second surface 15*r* have a front and back relationship with each other. The first surface 15*f* is a surface on the opening side of the container 1, and the second surface 15*r* is a surface on the bottom portion 12 side.

The circuit board 15 includes the constricted portions 33 and 34 at a center thereof in the X-axis direction in the plan view. The constricted portions 33 and 34 are constricted toward the center of the circuit board 15 on both sides in the Y-axis direction of the circuit board 15 in the plan view.

The circuit board 15 is inserted into an internal space of the container 1 with the second surface 15*r* facing the first pedestal 27 and the second pedestals 25 and 26. The circuit board 15 is fixed to the container 1 by being supported by the first pedestal 27 and the second pedestals 25 and 26. Specifically, the circuit board 15 is mechanically coupled to the first pedestal 27 via the fixing member 42 disposed in a ring shape around the connector 16 and is mechanically coupled to the second pedestals 25 and 26 via the fixing member 30. In the embodiment, the fixing member and the fixing member 42 are adhesives.

Two inertial sensors 300, a processing circuit 18, a storage circuit 19, other electronic components (not shown), and the like are disposed on the first surface 15*f* of the circuit board 15. The connector 16 is disposed on the second surface 15*r* of the circuit board 15. The processing circuit 18, the storage circuit 19, the two inertial sensors 300, and the connector 16 are electrically coupled to each other via a wiring (not shown). Although not shown, the circuit board 15 may be provided with another wiring or another terminal electrode. In addition, although the processing circuit 18 is disposed on the first surface 15f of the circuit board 15 in the embodiment, the processing circuit 18 may be disposed on the second surface 15r. The storage circuit 19 is disposed on the first surface 15f of the circuit board 15, and may be disposed on the second surface 15r.

The inertial sensor 300 is a sensor that detects a physical quantity by using inertia. In the embodiment, the inertial sensor 300 is an acceleration sensor capable of detecting an acceleration in one axial direction as the physical quantity. However, the inertial sensor 300 is not limited to the acceleration sensor and may be a sensor capable of detecting information related to inertia by a well-known detection method. For example, the inertial sensor 300 may be an angular velocity sensor. In addition, a sensor capable of detecting a physical quantity in multiaxial directions of 2 or more axes may be used. A structure or disposition of the inertial sensor 300 will be described later.

One of the two inertial sensors 300 disposed on the first surface 15f of the circuit board 15 is a first inertial sensor 301, and the other is a second inertial sensor 302. The first inertial sensor 301 detects an acceleration of a first detection axis H1. The second inertial sensor 302 detects an acceleration of a second detection axis H2. The second detection axis H2 of the second inertial sensor 302 is defined in a direction opposite to the first detection axis H1 of the first inertial sensor 301. That is, a positive direction of one of the first detection axis H1 and the second detection axis H2 is the same as a negative direction of the other axis. Therefore, a detection value of the second inertial sensor 302 is in opposite phase to a detection value of the first inertial sensor 301.

In the embodiment, the first detection axis H1 of the first inertial sensor 301 and the second detection axis H2 of the second inertial sensor 302 are detection axes along the Y-axis direction. Specifically, the first detection axis H1 of the first inertial sensor 301 is a detection axis in the Y direction, and the second detection axis H2 of the second inertial sensor 302 is a detection axis in the −Y direction. More specifically, the first detection axis H1 is a detection axis whose positive direction is the Y direction and whose negative direction is the −Y direction. The second detection axis H2 is a detection axis whose positive direction is the −Y direction and whose negative direction is the Y direction. Accordingly, for example, the positive direction of the first detection axis H1 and the negative direction of the second detection axis H2 are the same.

The first inertial sensor 301 detects an acceleration on the first detection axis H1 and sequentially outputs an output signal corresponding to a detection value to the processing circuit 18. The second inertial sensor 302 detects an acceleration on the second detection axis H2 and sequentially outputs an output signal corresponding to a detection value to the processing circuit 18.

The processing circuit 18 controls each unit necessary for operating the inertial measurement device 100. The processing circuit 18 is, for example, a central processing unit (CPU) or a digital signal processor (DSP). The processing circuit 18 executes a program stored in the storage circuit 19. Accordingly, the processing circuit 18 acquires the output signal output from the first inertial sensor 301 and the output signal output from the second inertial sensor 302 and performs signal processing.

The storage circuit 19 stores programs and data. The storage circuit 19 is a computer-readable storage medium such as a read-only memory (ROM) or a random access memory (RAM).

Although the processing circuit 18 and the storage circuit 19 are separate from each other in the embodiment, the processing circuit 18 and the storage circuit 19 may also be integrated. For example, the processing circuit 18 may be a micro-controller unit (MCU) including a CPU and the storage circuit 19.

The processing circuit 18 calculates a differential value that is a difference between a detection value of one inertial sensor 300 of the two inertial sensors 300 and a detection value of the other inertial sensor 300. By calculating the differential value, it is possible to amplify the detection value while canceling out in-phase error factors. Examples of the in-phase error factors include electrical noises and temperature characteristics of the inertial sensor 300.

Specifically, the processing circuit 18 generates, based on the output signal as the detection value of the first inertial sensor 301 and the output signal as the detection value of the second inertial sensor 302, a differential signal as a differential value that is a difference between the detection value of the first inertial sensor 301 and the detection value of the second inertial sensor 302. The differential signal generated by the processing circuit 18 is output to an external device coupled to the inertial measurement device 100 via the connector 16. In the embodiment, the differential signal output from the inertial measurement device 100 corresponds to a measurement value of an acceleration in the Y-axis direction measured by the inertial measurement device 100.

The structure of the inertial measurement device 100 has been described above. Next, a structure of the inertial sensor 300 provided in the above-described inertial measurement device 100 will be described with reference to FIGS. 6 and 7.

In the embodiment, the inertial sensor 300 is a frequency-variable type acceleration sensor. The frequency-variable type acceleration sensor includes a sensor element including a vibration element. The sensor element is configured to change a force applied to the vibration element according to an acceleration. When the force applied to the vibration element changes, a resonance frequency of the vibration element changes according to the force applied to the vibration element. In this way, by detecting the resonance frequency of the vibration element according to the acceleration, the frequency-variable type acceleration sensor can detect the acceleration.

As shown in FIG. 7, the inertial sensor 300 includes a sensor element 200 and a package 310. An accommodation space 311 that accommodates the sensor element 200 is defined in the package 310. In the embodiment, first, the sensor element 200 will be described with reference to FIG. 6, and then the inertial sensor 300 using the sensor element 200 will be described with reference to FIG. 7.

As shown in FIG. 6, the sensor element 200 includes a board structure 201 including a base portion 210 and the like, a vibration element 270 that is supported by the board structure 201 and detects an acceleration, and mass portions 280 and 282.

The board structure 201 has a flat plate shape having two main surfaces along an A-B plane orthogonal to the C-axis. The board structure 201 includes the base portion 210, a movable portion 214, a coupling portion 240, and four support portions coupled to the base portion 210. The four support portions are a first support portion 220, a second support portion 230, a third support portion 250, and a fourth support portion 260. Each support portion has an arm shape bent at a right angle along the A-axis and the B-axis. In the embodiment, the board structure 201 is formed of a quartz crystal board. The board structure 201 may be formed of a material other than quartz crystal.

The base portion 210 is coupled to the movable portion 214 via a groove-shaped joint portion 212 along the A-axis, thereby swingably supporting the movable portion 214. The base portion 210 has a U shape bent at a right angle in a plan view seen from the C-axis direction. The coupling portion 240 couples both ends of the U shape formed by the base portion 210. Accordingly, the base portion 210 and the coupling portion 240 form a substantial frame shape in the plan view. The first support portion 220 and the second support portion 230 are coupled to both sides of the base portion 210 in the A-axis direction. The third support portion 250 and the fourth support portion 260 are coupled to the base portion 210 at the vicinity of the coupling portion 240.

The joint portion 212 is provided between the base portion 210 and the movable portion 214 and couples the base portion 210 and the movable portion 214. The joint portion 212 is thinner than the base portion 210 and the movable portion 214. The joint portion 212 is formed in a constricted shape on both sides in the C-axis direction in a cross-sectional view seen from the A-axis direction. Therefore, the joint portion 212 that is thinner than the base portion 210 and the movable portion 214 functions as a fulcrum, that is, an intermediate hinge when the movable portion 214 is displaced with respect to the base portion 210.

The movable portion 214 is coupled to the base portion 210 via the joint portion 212. The movable portion 214 has a flat plate shape and has main surfaces 214a and 214b that face each other and that have a front and back relationship in the C-axis direction. The movable portion 214 is displaced in the C-axis direction with the joint portion 212 as a fulcrum according to an acceleration of a C-axis component. That is, the joint portion 212 and the movable portion 214 function as a cantilever.

The coupling portion 240 is disposed on a side of the movable portion 214 opposite to the joint portion 212 side, that is, in the B direction of the movable portion 214. The coupling portion 240 extends in the A-axis direction from one end portion of the base portion 210 where the third support portion 250 is provided to the other end portion of the base portion 210 where the fourth support portion 260 is provided.

The first support portion 220 and the second support portion 230 are provided symmetrically with respect to a center line of the vibration element 270 along the B-axis in the plan view. In addition, similarly, the third support portion 250 and the fourth support portion 260 are provided symmetrically with respect to the center line of the vibration element 270 along the B-axis in the plan view. A distal end portion of each of the first support portion 220, the second support portion 230, the third support portion 250, and the fourth support portion 260 is coupled to an inner side of the package 310. Accordingly, the first support portion 220, the second support portion 230, the third support portion 250, and the fourth support portion 260 support the board structure 201 in the accommodation space 311 of the package 310.

Both ends of the vibration element 270 are coupled to the base portion 210 and the movable portion 214 of the board structure 201. In other words, the vibration element 270 is provided across the base portion 210 and the movable portion 214 to straddle the joint portion 212.

In the embodiment, the vibration element 270 is formed of a quartz crystal board. The vibration element 270 may be formed of a piezoelectric material other than quartz crystal. However, the vibration element 270 and the board structure 201 are preferably formed of the same material. Accordingly, since a difference between a linear expansion coefficient of the board structure 201 and a linear expansion coefficient of the vibration element 270 is small, it is possible to reduce a stress applied from the board structure 201 to the vibration element 270 caused by the difference in the linear expansion coefficient.

In the embodiment, the vibration element 270 is a double-tuning-fork type vibration element including two vibration beam portions 271a and 271b each along the B-axis, and a first base portion 272a and a second base portion 272b terminating both ends of each of the vibration beam portions 271a and 271b. The first base portion 272a is coupled to the movable portion 214. The second base portion 272b is coupled to the base portion 210 of the board structure 201. The vibration element 270 includes electrodes (not shown) provided on a surface thereof, for example, an excitation electrode and an extraction electrode. When a drive signal with an AC voltage is applied to the excitation electrode (not shown) provided on the vibration beam portions 271a and 271b, the vibration beam portions 271a and 271b perform flexural vibration in the A-axis direction so as to be separated from each other or approach each other.

Although the vibration element 270 is a double-tuning-fork type vibration element in the embodiment, the vibration element 270 is not limited to the double-tuning-fork type vibration element. For example, the vibration element 270 may be a single beam vibration element including one vibration beam portion.

The mass portions 280 and 282 are provided on the main surfaces 214a and 214b of the movable portion 214. Specifically, two mass portions 280 are provided on the main surface 214a via a bonding material (not shown). On the other hand, two mass portions 282 are provided on the main surface 214b via a bonding material (not shown). The mass portions 280 and 282 may be formed of a metal such as copper (Cu) or gold (Au).

In the sensor element 200 configured as described above, for example, when an acceleration in the C direction is applied, the movable portion 214 is displaced in the −C direction with the joint portion 212 as a fulcrum. Accordingly, a force in a direction in which the first base portion 272a and the second base portion 272b are separated from each other along the B-axis is applied to the vibration element 270, and a tensile stress is generated in the vibration beam portions 271a and 271b. Therefore, resonance frequencies of the vibration beam portions 271a and 271b increase. On the other hand, when an acceleration in the −C direction is applied to the sensor element 200, the movable portion 214 is displaced in the C direction with the joint portion 212 as a fulcrum. Accordingly, a force in a direction in which the first base portion 272a and the second base portion 272b approach each other along the B-axis is applied to the vibration element 270, and a compressive stress is generated in the vibration beam portions 271a and 271b. Therefore, the resonance frequencies of the vibration beam portions 271a and 271b decrease.

In this way, the sensor element 200 can detect an acceleration in the C-axis direction based on a resonance frequency of the vibration element 270. In other words, the sensor element 200 configured as described above is a frequency-variable type acceleration sensor element whose detection axis is the C-axis.

Next, the inertial sensor 300 using the above-described sensor element 200 will be described. As shown in FIG. 7, the inertial sensor 300 includes the sensor element 200 and the package 310. The package 310 includes a package base 320 and a lid 330.

The package base 320 has a box shape including a recessed portion 321 opened toward the C direction. The lid 330 has a flat plate shape. The lid 330 is coupled to the package base 320 via a lid bonding member 332 so as to close the opening of the recessed portion 321. By closing the opening of the recessed portion 321 by the lid 330, the accommodation space 311 in which the sensor element 200 is accommodated is formed. The accommodation space 311 is hermetically sealed.

The package base 320 includes a step portion 323 protruding from an inner bottom surface 322 of the package base 320 toward the lid 330. For example, the step portion 323 is provided in a frame shape along an inner wall of the package base 320. The step portion 323 is provided with a plurality of internal terminals 340b.

The plurality of internal terminals 340b are coupled to the first support portion 220, the second support portion 230, the third support portion 250, and the fourth support portion 260 of the sensor element 200. Specifically, each of the first support portion 220, the second support portion 230, the third support portion 250, and the fourth support portion 260 is provided with a fixing portion coupling terminal 79b. The fixing portion coupling terminal 79b and the internal terminal 340b are disposed to face each other so as to overlap each other in the plan view seen from the C-axis direction. The fixing portion coupling terminal 79b and the internal terminal 340b are electrically and mechanically coupled to each other via a conductive adhesive 343. In this way, the sensor element 200 is mounted to the package 310 in the accommodation space 311 of the package 310.

The package base 320 includes an external terminal 344 provided on an outer bottom surface 324. The external terminal 344 is electrically coupled to the internal terminal 340b via an internal wiring (not shown). In addition, for example, as shown in FIG. 5, when the inertial sensor 300 is disposed on the first surface 15f of the circuit board 15, the external terminal 344 is electrically coupled to a wiring (not shown) provided on the circuit board 15. The external terminal 344 may be provided not only on the outer bottom surface 324 but also on an outer wall of the package base 320.

In the inertial sensor 300 having such a configuration, when a drive signal is applied to an excitation electrode of the sensor element 200 via the external terminal 344, the internal terminal 340b, the fixing portion coupling terminal 79b, and the like, the vibration beam portions 271a and 271b of the sensor element 200 resonate at a predetermined frequency. Then, the inertial sensor 300 outputs, as an output signal, a resonance frequency of the sensor element 200 that changes according to an acceleration.

The inertial sensor 300 configured as described above is a frequency-variable type acceleration sensor whose detection axis is the C-axis. By matching the C-axis which is the detection axis of the inertial sensor 300 with a desired direction, the inertial sensor 300 can detect an acceleration in the desired direction.

The structure of the inertial sensor 300 has been described above. Next, referring back to FIG. 5, a disposition of the inertial sensor 300 will be described. For example, as shown in FIG. 5, when a side surface of the package 310 is opposite to the first surface 15f of the circuit board 15 and the inertial sensor 300 is vertically mounted on the circuit board 15 (upright mounting), the C-axis which is the detection axis of the inertial sensor 300 is along the first surface 15f of the circuit board 15.

Specifically, the first inertial sensor 301 is mounted such that the C-axis of the first inertial sensor 301, that is, the positive direction of the first detection axis H1 of the first inertial sensor 301 coincides with the Y direction in a state in which the first inertial sensor 301 is mounted upright on the first surface 15f of the circuit board 15. In addition, the second inertial sensor 302 is mounted such that the C-axis of the second inertial sensor 302, that is, the positive direction of the second detection axis H2 of the second inertial sensor 302 coincides with the −Y direction in a state in which the second inertial sensor 302 is mounted upright on the first surface 15f of the circuit board 15. In other words, the first inertial sensor 301 has the first detection axis H1 along the circuit board 15, and the second inertial sensor 302 has the second detection axis H2 defined in the direction opposite to the first detection axis H1.

In this way, by mounting the first inertial sensor 301 and the second inertial sensor 302 on the circuit board the first inertial sensor 301 and the second inertial sensor 302 can detect an acceleration in the Y-axis direction. The detection value of the second inertial sensor 302 is in opposite phase to the detection value of the first inertial sensor 301.

In the embodiment, the first inertial sensor 301 and the second inertial sensor 302 have the same structure. However, structures of the first inertial sensor 301 and the second inertial sensor 302 may also be different from each other.

For example, when the circuit board 15 is warped due to thermal expansion of the circuit board 15 or due to an external force, a stress from the circuit board 15 is applied to members disposed on the first surface 15f and the second surface 15r. Stresses are applied to the first surface 15f and the second surface 15r from mutually opposite directions. For example, when a compressive stress is applied to a member disposed on the first surface 15f, a tensile stress is applied to a member disposed on the second surface 15r. The stress from the circuit board 15 distorts the sensor element 200 and the like accommodated in the package 310 via the package 310, so that detection accuracy of the inertial sensor 300 is reduced.

In the embodiment, as described above, the first inertial sensor 301 and the second inertial sensor 302 are disposed on the first surface 15f of the circuit board 15. That is, the first inertial sensor 301 and the second inertial sensor 302 are disposed on one surface of the circuit board 15. The expression "disposed on one surface of the circuit board 15" means that the components are disposed on the same surface of the circuit board 15.

By disposing the first inertial sensor 301 and the second inertial sensor 302 on the one surface of the circuit board 15, the stress from the circuit board 15 is generated from the same direction (direction orthogonal to the detection axis) in the first inertial sensor 301 and the second inertial sensor 302. For example, when a compressive stress from the circuit board 15 is applied to the first inertial sensor 301, the compressive stress from the circuit board 15 is also applied to the second inertial sensor 302. That is, noises caused by the stress from the circuit board 15 are in-phase error factors. Therefore, by generating the differential signal which is the difference between the output signal of the first inertial sensor 301 and the output signal of the second inertial sensor 302, it is possible to cancel out the noise caused by the stress from the circuit board 15. Therefore, accuracy of an acceleration measurement value output from the inertial measurement device 100 is improved.

Although the first inertial sensor 301 and the second inertial sensor 302 are disposed on the first surface 15f in the embodiment, the first inertial sensor 301 and the second inertial sensor 302 may be disposed on the second surface 15r.

In addition, as described above, the first inertial sensor 301 and the second inertial sensor 302 are mounted upright on the first surface 15f of the circuit board 15. Accordingly, a mounting region in which the first inertial sensor 301 and the second inertial sensor 302 are mounted is reduced as compared with a case where a bottom surface of the package 310 faces the first surface 15f of the circuit board 15 and the inertial sensor 300 is mounted horizontally on the circuit board 15 (horizontal mounting). Therefore, the noise caused by the stress from the circuit board 15 can be reduced, and the accuracy of the acceleration measurement value output from the inertial measurement device 100 is improved.

In addition, as described above, the C-axis which is the detection axis of the first inertial sensor 301 and the second inertial sensor 302 is the direction along the first surface 15f of the circuit board 15. When the Z direction which is a normal direction of the first surface 15f is along a gravity direction and the inertial measurement device 100 is in a stationary state, detection signals of the first inertial sensor 301 and the second inertial sensor 302 are in a state in which an acceleration is zero, that is, are signals corresponding to an origin. However, in general, an acceleration sensor such as the inertial sensor 300 may cause so-called origin drift during which a position of the origin moves.

As described above, in the embodiment, the differential signal which is the difference between the output signal of the first inertial sensor 301 and the output signal of the second inertial sensor 302 is generated. Origin drifts in the detection signals of the first inertial sensor 301 and the second inertial sensor 302 are canceled out by generating the differential signal when the origin drifts are in-phase error factors. Therefore, an origin drift of the acceleration measurement value output from the inertial measurement device 100 is reduced, and origin stability is improved. In this way, since a measurement value with high origin stability is obtained, the inertial measurement device 100 can be suitably used, for example, as an inclination sensor.

In the embodiment, the inertial measurement device 100 measures an acceleration in the Y-axis direction. However, the physical quantity measured by the inertial measurement device 100 is not limited thereto. For example, the inertial measurement device 100 may measure an acceleration in the X-axis direction or the Z-axis direction. Specifically, the acceleration in the X-axis direction can be measured by mounting the inertial sensor 300 upright on the first surface such that the C-axis of the inertial sensor 300 coincides with the X-axis direction. In addition, the acceleration in the Z-axis direction can be measured by mounting the inertial sensor 300 horizontally on the first surface 15f such that the C-axis of the inertial sensor 300 coincides with the Z-axis direction. In addition, by combining these mounting manners, for example, the inertial measurement device 100 may measure an acceleration in two axial directions along the X-axis and the Y-axis or may measure an acceleration in three axial directions along the X-axis, the Y-axis, and the Z-axis.

Figure 8:
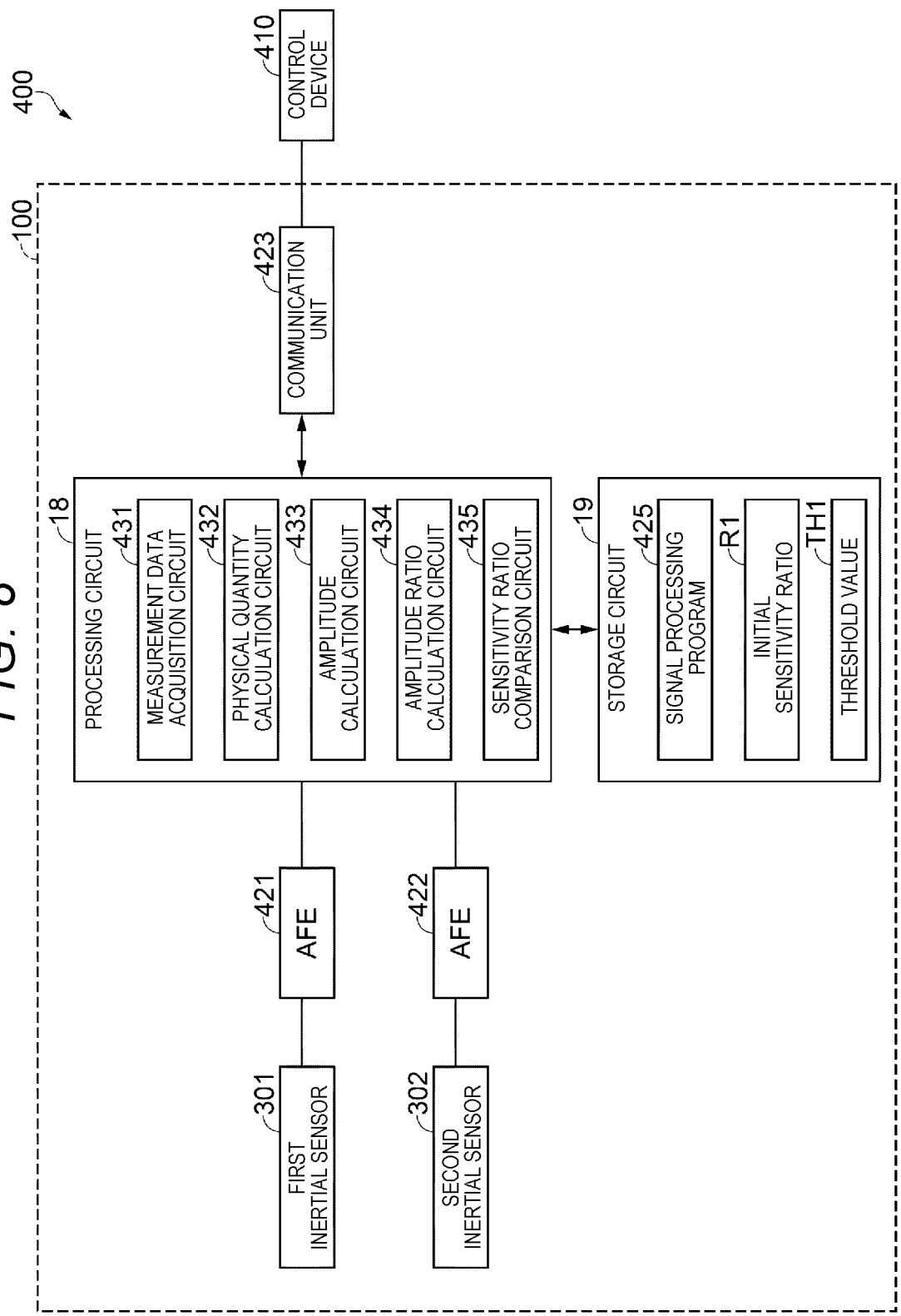
FIG. 8 shows a configuration example of a measurement system including the inertial measurement device.

The disposition of the inertial sensor 300 has been described above. Next, a functional configuration of the inertial measurement device 100 will be described with reference to FIG. 8. FIG. 8 shows a configuration example of a measurement system 400 including the inertial measurement device 100. As shown in FIG. 8, the measurement system 400 includes the inertial measurement device 100 and a control device 410.

The inertial measurement device 100 is fixed to an attachment target body (not shown) and measures a physical quantity occurring on an attachment target body. In the embodiment, the inertial measurement device 100 measures an acceleration as the physical quantity. In addition, the inertial measurement device 100 may measure an inclination of the attachment target body. The control device 410 controls the inertial measurement device 100 and performs processing based on an output signal of the inertial measurement device 100. The control device 410 is, for example, a computer. The control device 410 may include general hardware as a computer such as a processing device, a storage device, an input and output device, and a display device, all of which are not shown. The control device 410 and the inertial measurement device 100 are communicably connected to each other.

The inertial measurement device 100 includes the first inertial sensor 301, the second inertial sensor 302, two analog front ends (AFE) 421 and 422, the processing circuit 18, the storage circuit 19, and a communication unit 423. The communication unit 423 establishes a communication link with the control device 410 and includes a communication circuit that processes a signal transmitted through the communication link. The communication link may be wired or wireless.

The first inertial sensor 301 detects an acceleration on the first detection axis H1 and sequentially outputs an output signal corresponding to a detection value thereof to the AFE 421. The AFE 421 sequentially outputs a digital signal corresponding to the output of the first inertial sensor 301 by performing amplification processing, A/D conversion processing, or the like on the output signal of the first inertial sensor 301. The second inertial sensor 302 detects an acceleration on the second detection axis H2 and sequentially outputs an output signal corresponding to a detection value thereof to the AFE 422. The AFE 422 sequentially outputs a digital signal corresponding to the output of the second inertial sensor 302 by performing amplification processing, A/D conversion processing, or the like on the output signal of the second inertial sensor 302.

In the embodiment, time-series data of an output signal of the AFE 421 is referred to as measurement data D1 of the first inertial sensor 301. Time-series data of an output signal of the AFE 422 is referred to as measurement data D2 of the second inertial sensor 302.

The processing circuit 18 sequentially receives the digital signals output from the AFEs 421 and 422. The processing circuit 18 executes a signal processing program 425 stored in the storage circuit 19 so as to perform various types of calculation processing on the digital signals input from the AFEs 421 and 422. In addition, the processing circuit 18 performs processing of controlling the first inertial sensor 301 and the second inertial sensor 302 to detect an acceleration, processing of controlling the communication unit 423 to perform data communication with the control device 410, and the like.

By executing the signal processing program 425, the processing circuit 18 functions as a measurement data acquisition circuit 431, a physical quantity calculation circuit 432, an amplitude calculation circuit 433, an amplitude ratio calculation circuit 434, and a sensitivity ratio comparison circuit 435. That is, the processing circuit 18 includes the measurement data acquisition circuit 431, the physical quantity calculation circuit 432, the amplitude calculation circuit 433, the amplitude ratio calculation circuit 434, and the sensitivity ratio comparison circuit 435. At least a part of the functions may be implemented by a logic device.

The measurement data acquisition circuit 431 acquires the measurement data D1 and D2 of the first inertial sensor 301 and the second inertial sensor 302, respectively. Specifically, the measurement data acquisition circuit 431 sequentially acquires the digital signals output from the AFEs 421 and 422.

The physical quantity calculation circuit 432 calculates the physical quantity based on the measurement data D1 of the first inertial sensor 301 and the measurement data D2 of the second inertial sensor 302. The physical quantity calculation circuit 432 can transmit a calculation value of the physical quantity calculated based on the measurement data D1 of the first inertial sensor 301 and the measurement data D2 of the second inertial sensor 302 to the control device 410 as a measurement value of the physical quantity measured by the inertial measurement device 100.

Specifically, the physical quantity calculation circuit 432 calculates a differential value that is a difference between the measurement data D1 of the first inertial sensor 301 and the measurement data D2 of the second inertial sensor 302 at a certain time. Then, the physical quantity calculation circuit 432 converts the differential value into the physical quantity. For example, information defining a correspondence relationship between the differential value and the physical quantity is stored in the storage circuit 19, and the physical quantity calculation circuit 432 can convert the differential value into the physical quantity based on the information. The information is, for example, a reference table or a relational equation that defines the correspondence relationship between the differential value and the physical quantity. Before conversion into the physical quantity, filter processing for reducing noise or the like may be performed on the measurement data D1 and D2 or the differential value. In addition, temperature correction may be performed on the measurement data D1 and D2 or the differential value based on temperature characteristics of the first inertial sensor 301 and the second inertial sensor 302.

The amplitude calculation circuit 433 calculates an amplitude A1 of the measurement data D1 of the first inertial sensor 301 and an amplitude A2 of the measurement data D2 of the second inertial sensor 302 at a certain time.

Here, the amplitude A1 of the measurement data D1 of the first inertial sensor 301 and the amplitude A2 of the measurement data D2 of the second inertial sensor 302 at a certain time will be described with reference to FIGS. 9A and 9B.

Figure 9A:
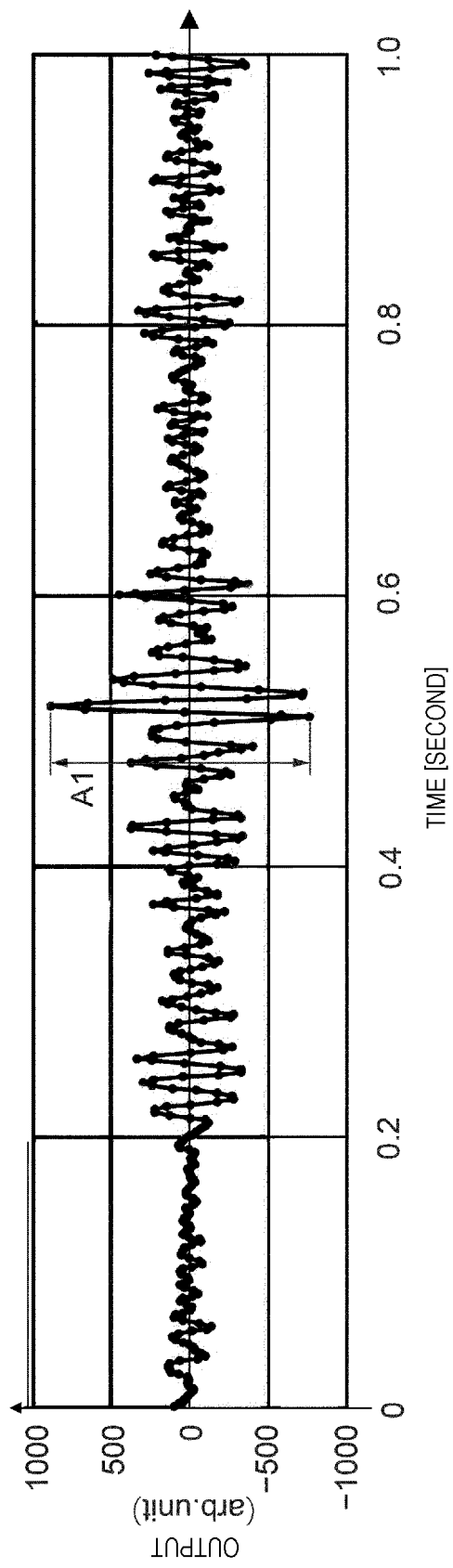
FIG. 9A shows an example of a waveform of measurement data of a first inertial sensor.

A waveform diagram shown in FIG. 9A is an example of a waveform of the measurement data D1. A waveform diagram shown in FIG. 9B is an example of a waveform of the measurement data D2. As shown in FIGS. 9A and 9B, the measurement data D1 and the measurement data D2 are opposite phases of each other. The expression "be opposite phases of each other" includes a case where the measurement data D1 and the measurement data D2 are not exactly opposite phases due to a difference in characteristics of the first inertial sensor 301 and the second inertial sensor 302, for example, a difference in temperature characteristics, or due to noises.

In the embodiment, a peak-to-peak value is calculated for each of the amplitudes A1 and A2. The peak-to-peak value is a value showing a difference between a positive maximum value and a negative maximum value in a certain time interval. The amplitudes A1 and A2 of the measurement data D1 and the measurement data D2 are not limited to peak-to-peak values and may be calculated based on, for example, a standard deviation, or a root mean square value. In FIGS. 9A and 9B, the amplitudes A1 and A2 in a time interval from 0.4 seconds to 0.6 seconds are shown as examples of the amplitudes A1 and A2 of the measurement data D1 and the measurement data D2, respectively.

Referring back to FIG. 8, description of the inertial measurement device 100 will be continued. The amplitude ratio calculation circuit 434 calculates an amplitude ratio A1/A2 which is a ratio of the amplitude A1 of the measurement data D1 to the amplitude A2 of the measurement data D2.

Here, the amplitude ratio A1/A2 of the amplitude A1 of the measurement data D1 to the amplitude A2 of the measurement data D2 when an abnormality occurs in the first inertial sensor 301 or the second inertial sensor 302 will be described. When an abnormality during which sensitivity changes occurs in the inertial measurement device 100, the sensitivity of the inertial sensor 300 generally decreases. Therefore, an amplitude of measurement data of the inertial sensor 300 in which the abnormality occurs decreases as the sensitivity decreases.

For example, when an abnormality occurs in the first inertial sensor 301 among the first inertial sensor 301 and the second inertial sensor 302, sensitivity of the first inertial sensor 301 decreases. Accordingly, the amplitude A1 of the measurement data D1 of the first inertial sensor 301 in which the abnormality occurs is smaller than that in a normal state. Therefore, when the abnormality occurs in the first inertial sensor 301, the amplitude ratio A1/A2 is smaller than that when the first inertial sensor 301 is normal. In addition, when an abnormality occurs in the second inertial sensor 302, sensitivity of the second inertial sensor 302 decreases. Accordingly, the amplitude A2 of the measurement data D2 of the second inertial sensor 302 in which the abnormality occurs is smaller than that in a normal state. Therefore, when the abnormality occurs in the second inertial sensor 302, the amplitude ratio A1/A2 is larger than that in the normal state.

In this way, when the abnormality occurs in the inertial measurement device 100, the amplitude ratio A1/A2 changes.

Therefore, self-diagnosis of the inertial measurement device 100 can be performed based on the amplitude ratio A1/A2.

The sensitivity ratio comparison circuit 435 acquires an initial sensitivity ratio R1 stored in advance in the storage circuit 19 from the storage circuit 19 and compares the amplitude ratio A1/A2 of the amplitude A1 of the measurement data D1 to the amplitude A2 of the measurement data D2 with the initial sensitivity ratio R1. Then, the sensitivity ratio comparison circuit 435 performs the self-diagnosis of the inertial measurement device 100 based on a comparison result between the amplitude ratio A1/A2 and the initial sensitivity ratio R1.

The initial sensitivity ratio R1 is a ratio of the sensitivity of the first inertial sensor 301 to the sensitivity of the second inertial sensor 302 when the first inertial sensor 301 and the second inertial sensor 302 are normal. In other words, the initial sensitivity ratio R1 corresponds to a ratio of the amplitude A1 of the measurement data D1 of the first inertial sensor 301 to the amplitude A2 of the measurement data D2 of the second inertial sensor 302 when the first inertial sensor 301 and the second inertial sensor 302 are normal. The initial sensitivity ratio R1 is also referred to as a sensitivity ratio R1.

An example of a procedure for calculating the initial sensitivity ratio R1 will be described. First, the amplitude A1 of the measurement data D1 when a predetermined acceleration occurs on the first detection axis H1 of the first inertial sensor 301 and the amplitude A2 of the measurement data D2 when the predetermined acceleration occurs on the second detection axis H2 of the second inertial sensor 302 are measured. The predetermined acceleration is, for example, a gravitational acceleration.

Next, the initial sensitivity ratio R1 is calculated based on the amplitude A1 when the predetermined acceleration occurs on the first detection axis H1 and the amplitude A2 when the predetermined acceleration occurs on the second detection axis H2. The initial sensitivity ratio R1 is (the amplitude A1 when the predetermined acceleration occurs on the first detection axis H1)/(the amplitude A2 when the predetermined acceleration occurs on the second detection axis H2).

Measurement of the amplitude A1 when the predetermined acceleration occurs on the first detection axis H1 and the amplitude A2 when the predetermined acceleration occurs on the second detection axis H2 is performed when the first inertial sensor 301 and the second inertial sensor 302 are normal. As the normal state, for example, a state in which output characteristics of the first inertial sensor 301 and the second inertial sensor 302 are confirmed to be within a predetermined range can be adopted. The measurement of the amplitude A1 when the predetermined acceleration occurs on the first detection axis H1 and the amplitude A2 when the predetermined acceleration occurs on the second detection axis H2 is performed, for example, at the time of shipping the inertial measurement device 100, that is, before shipment.

As described above, the initial sensitivity ratio R1 corresponds to the amplitude ratio A1/A2 when the first inertial sensor 301 and the second inertial sensor 302 are normal. Therefore, by comparing the amplitude ratio A1/A2 with the initial sensitivity ratio R1, the self-diagnosis of the inertial measurement device 100 can be performed.

Hereinafter, processing of comparing the amplitude ratio A1/A2 with the initial sensitivity ratio R1 will be described in detail. In the embodiment, the sensitivity ratio comparison circuit 435 performs the self-diagnosis of the inertial measurement device 100 based on whether the amplitude ratio A1/A2 is within a reference range including the initial sensitivity ratio R1.

The reference range is determined as a range which a value of the amplitude ratio A1/A2 is to be within when the first inertial sensor 301 and the second inertial sensor 302 are normal. When the amplitude ratio A1/A2 is compared with the reference range and the amplitude ratio A1/A2 is within the reference range, the sensitivity ratio comparison circuit 435 determines that the inertial measurement device 100 is normal. When the amplitude ratio A1/A2 is compared with the reference range and the amplitude ratio A1/A2 is not within the reference range, the sensitivity ratio comparison circuit 435 determines that the inertial measurement device 100 is abnormal.

In the embodiment, the reference range is defined by the initial sensitivity ratio R1 and a threshold value TH1. The threshold value TH1 is stored in advance in the storage circuit 19 as a value for defining a width of the reference range. That is, the storage circuit 19 stores the initial sensitivity ratio R1 and the threshold value TH1 as the reference range. Instead of the initial sensitivity ratio R1 and the threshold value TH1, only an upper limit value and a lower limit value may be stored. The reference range may be changed to any suitable range as long as the range includes the initial sensitivity ratio R1.

For example, an upper limit of the reference range is (initial sensitivity ratio R1+threshold value TH1), and a lower limit of the reference range is (initial sensitivity ratio R1−threshold value TH1). The threshold value TH1 is positive. That is, "within the reference range" in the embodiment is smaller than (initial sensitivity ratio R1+threshold value TH1) and larger than (initial sensitivity ratio R1−threshold value TH1).

When the amplitude ratio A1/A2 is within the reference range, an absolute value of a difference between the amplitude ratio A1/A2 and the initial sensitivity ratio R1 is smaller than the threshold value TH1. When the amplitude ratio A1/A2 is not within the reference range, the absolute value of the difference between the amplitude ratio A1/A2 and the initial sensitivity ratio R1 is equal to or larger than the threshold value TH1. That is, whether the amplitude ratio A1/A2 is within the reference range defined by the initial sensitivity ratio R1 and the threshold value TH1 can be determined by comparing the absolute value of the difference between the amplitude ratio A1/A2 and the initial sensitivity ratio R1 with the threshold value TH1.

In the embodiment, in order to compare the amplitude ratio A1/A2 with the initial sensitivity ratio R1, the sensitivity ratio comparison circuit 435 first calculates the absolute value of the difference between the amplitude ratio A1/A2 and the initial sensitivity ratio R1. Next, the sensitivity ratio comparison circuit 435 acquires the threshold value TH1 stored in the storage circuit 19 from the storage circuit 19 and compares the absolute value of the difference between the amplitude ratio A1/A2 and the initial sensitivity ratio R1 with the threshold value TH1.

Although "within the reference range" does not include a value that is a boundary of the range in the embodiment, a value that is a boundary of the range may also be included. That is, the sensitivity ratio comparison circuit 435 may determine that the inertial measurement device 100 is normal when the absolute value of the difference between the amplitude ratio A1/A2 and the initial sensitivity ratio R1 is equal to the threshold value TH1.

The processing of comparing the amplitude ratio A1/A2 with the initial sensitivity ratio R1 has been described in detail. As described above, the self-diagnosis of the inertial measurement device 100 can be performed by comparing the amplitude ratio A1/A2 with the initial sensitivity ratio R1.

In the embodiment, the amplitude ratio A1/A2 compared with the initial sensitivity ratio R1 is calculated based on the acceleration occurring on the inertial measurement device 100, that is, the acceleration occurring on the attachment target body to which the inertial measurement device 100 is attached. That is, in the embodiment, it is possible to perform the self-diagnosis of the inertial measurement device 100 by using the acceleration occurring on the attachment target body. The acceleration occurring on the attachment target body includes, for example, an acceleration that occurs due to environmental vibration, natural vibration, or spontaneous vibration of the attachment target body.

In this way, since the self-diagnosis of the inertial measurement device 100 is performed by using the acceleration occurring on the attachment target body, it is not necessary to provide any self-diagnosis electrode and any configuration necessary for excitation of the self-diagnosis electrode. Therefore, it is possible to prevent a decrease in accuracy of self-diagnosis caused by redundancy.

In addition, in the embodiment, when the self-diagnosis of the inertial measurement device 100 is performed, it is not necessary to stop the measurement of the acceleration performed by the inertial measurement device 100. Therefore, downtime of the inertial measurement device 100 can be reduced.

Figure 10:
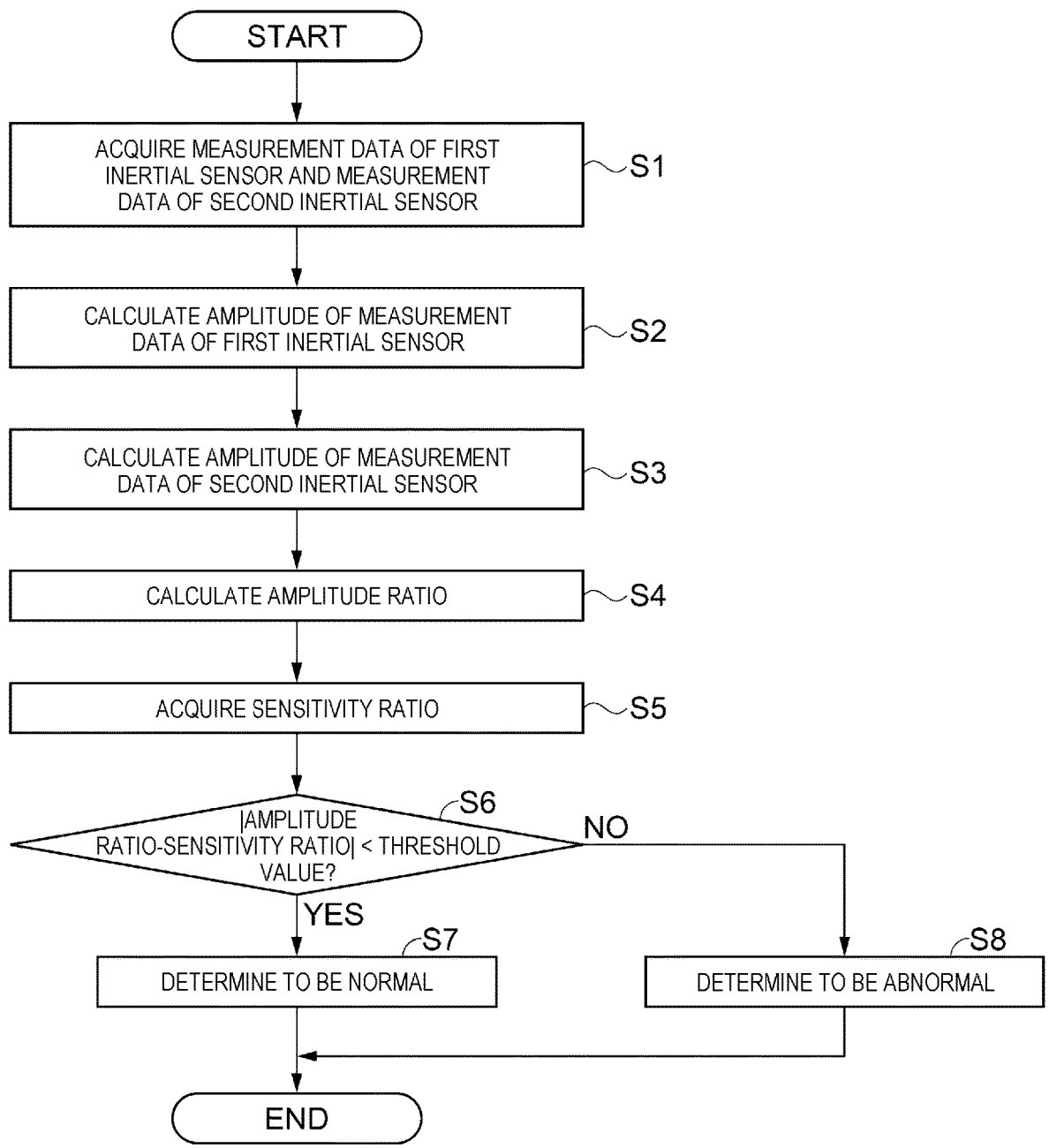
FIG. 10 is a flowchart showing an example of a procedure of a self-diagnosis method of the inertial measurement device.

The inertial measurement device 100 has been described above. Next, a self-diagnosis method of the inertial measurement device 100 according to the first embodiment will be described with reference to FIG. 10. Steps S1 to S8 shown in FIG. 10 are performed by the processing circuit 18 executing the signal processing program 425.

When a self-diagnosis command for starting the self-diagnosis of the inertial measurement device 100 is input to the inertial measurement device 100, the self-diagnosis of the inertial measurement device 100 is started. In the embodiment, the self-diagnosis command is transmitted from the control device 410 shown in FIG. 8 to the inertial measurement device 100. However, the self-diagnosis command is not limited to being from the control device 410 and may be input to the inertial measurement device 100 by, for example, operating a button (not shown) provided on the inertial measurement device 100, or may be periodically input to the inertial measurement device 100 by a timer (not shown) provided in the inertial measurement device 100.

In step S1, the measurement data acquisition circuit 431 acquires the measurement data D1 of the first inertial sensor 301 and the measurement data D2 of the second inertial sensor 302.

In step S2, the amplitude calculation circuit 433 calculates the amplitude A1 of the measurement data D1 of the first inertial sensor 301. In step S3, the amplitude calculation circuit 433 calculates the amplitude A2 of the measurement data D2 of the second inertial sensor 302. As described above, in the embodiment, the amplitude calculation circuit 433 calculates the peak-to-peak values of the amplitudes A1 and A2 of the measurement data D1 and the measurement data D2.

In step S4, the amplitude ratio calculation circuit 434 calculates the amplitude ratio A1/A2. Specifically, the amplitude ratio calculation circuit 434 calculates the amplitude ratio A1/A2 which is a ratio of the amplitude A1 calculated in step S2 to the amplitude A2 calculated in step S3.

In step S5, the sensitivity ratio comparison circuit 435 acquires, from the storage circuit 19, the initial sensitivity ratio R1 and the threshold value TH1 as the reference range.

In step S6, the sensitivity ratio comparison circuit 435 determines whether the amplitude ratio A1/A2 is within the reference range defined by the initial sensitivity ratio R1 and the threshold value TH1. For example, the sensitivity ratio comparison circuit 435 first calculates the absolute value of the difference between the amplitude ratio A1/A2 calculated in step S4 and the threshold value TH1 acquired in step S5. Next, the sensitivity ratio comparison circuit 435 compares the absolute value of the difference between the amplitude ratio A1/A2 and the initial sensitivity ratio R1 with the threshold value TH1.

When the absolute value of the difference between the amplitude ratio A1/A2 and the initial sensitivity ratio R1 is smaller than the threshold value TH1, the sensitivity ratio comparison circuit 435 determines that the amplitude ratio A1/A2 is within the reference range. When the absolute value of the difference between the amplitude ratio A1/A2 and the initial sensitivity ratio R1 is larger than the threshold value TH1, or when the absolute value of the difference between the amplitude ratio A1/A2 and the initial sensitivity ratio R1 is equal to the threshold value TH1, the sensitivity ratio comparison circuit 435 determines that the amplitude ratio A1/A2 is not within the reference range. The sensitivity ratio comparison circuit 435 advances the processing to step S7 when it is determined that the amplitude ratio A1/A2 is within the reference range, and advances the processing to step S8 when it is determined that the amplitude ratio A1/A2 is not within the reference range.

In step S7, the sensitivity ratio comparison circuit 435 determines that the inertial measurement device 100 is normal, and transmits this self-diagnosis result to the control device 410. In step S8, the sensitivity ratio comparison circuit 435 determines that the inertial measurement device 100 is abnormal, and transmits this self-diagnosis result to the control device 410. In addition to the self-diagnosis result of the inertial measurement device 100, the processing circuit 18 may transmit information used for the self-diagnosis of the inertial measurement device 100 to the control device 410. When step S7 or step S8 ends, the processing circuit 18 ends the self-diagnosis method of the inertial measurement device 100.

The control device 410 may have a function of displaying the self-diagnosis result of the inertial measurement device 100 and the information used for the self-diagnosis of the inertial measurement device 100 on a display device (not shown) provided on the control device 410. Examples of the information used for the self-diagnosis of the inertial measurement device 100 include the measurement data D1 and D2, the amplitude ratio A1/A2, the initial sensitivity ratio R1, and the threshold value TH1.

When the self-diagnosis ends, the inertial measurement device 100 may continue to measure the acceleration. An operation of the inertial measurement device 100 after the end of the self-diagnosis is not limited thereto. For example, the inertial measurement device 100 may stop the measurement of the acceleration after the self-diagnosis during which abnormality is determined ends.

As described above, according to the embodiment, the following effects can be obtained.

The inertial measurement device 100 includes: the first inertial sensor 301 having the first detection axis H1; the second inertial sensor 302 having the second detection axis H2 defined in the direction opposite to the first detection axis H1; and the processing circuit 18 configured to execute self-diagnosis based on whether the amplitude ratio A1/A2 that is a ratio of the amplitude A1 of the output of the first inertial sensor 301 to the amplitude A2 of the output of the second inertial sensor 302 is within the reference range. Accordingly, it is possible to prevent a decrease in accuracy of self-diagnosis of the inertial measurement device 100.

In addition, in the self-diagnosis method of the inertial measurement device 100 including the first inertial sensor 301 having the first detection axis H1, the second inertial sensor 302 having the second detection axis H2 defined in the direction opposite to the first detection axis H1, and the processing circuit 18 configured to acquire an output of the first inertial sensor 301 and an output of the second inertial sensor 302, the processing circuit 18 executes self-diagnosis based on whether a ratio of the amplitude A1 of the output of the first inertial sensor 301 to the amplitude A2 of the output of the second inertial sensor 302 is within the reference range. Accordingly, it is possible to prevent a decrease in accuracy of self-diagnosis of the inertial measurement device 100.

2. Second Embodiment

Next, the inertial measurement device 100 and a self-diagnosis method of the inertial measurement device 100 according to a second embodiment will be described. The inertial measurement device 100 according to the second embodiment is the same as that of the first embodiment except that an operation of the processing circuit 18 is different when the inertial measurement device 100 is determined to be abnormal. Description of the same configuration as that of the first embodiment will be omitted.

First, the inertial measurement device 100 according to the embodiment will be described. As described above, in general, an amplitude of measurement data of the inertial sensor 300 in which an abnormality occurs decreases. By using this fact, when it is determined that the inertial measurement device 100 is abnormal, it is possible to specify a normal inertial sensor among the first inertial sensor 301 and the second inertial sensor 302.

In the embodiment, when an abnormality is determined as a result of self-diagnosis, the inertial measurement device 100 specifies a normal inertial sensor among the first inertial sensor 301 and the second inertial sensor 302 by comparing the amplitude A1 with the amplitude A2. For example, when the amplitude A1 is larger than the amplitude A2, the first inertial sensor 301 is less likely to be abnormal than the second inertial sensor 302. That is, when a self-diagnosis result is abnormal and the amplitude A1 is larger than the amplitude A2, the first inertial sensor 301 can be specified as a normal inertial sensor, and the second inertial sensor 302 can be specified as an abnormal inertial sensor.

When it is determined that the inertial measurement device 100 is abnormal, the processing circuit 18 transmits a calculated value of a physical quantity calculated based on measurement data of the normal inertial sensor among the first inertial sensor 301 and the second inertial sensor 302 to the control device 410 as a measurement value of the physical quantity measured by the inertial measurement device 100.

As compared with a calculated value of the physical quantity calculated based on a differential value between measurement data of the abnormal inertial sensor and measurement data of the normal inertial sensor, the calculated value of the physical quantity calculated based on the measurement data of the normal inertial sensor has higher reliability when used as the measurement value of the inertial measurement device 100. Therefore, when it is determined that the inertial measurement device 100 is abnormal, the calculated value of the physical quantity calculated based on the measurement data of the normal inertial sensor is used as the measurement value of the physical quantity measured by the inertial measurement device 100, so that a certain level of reliability can be ensured for the measured value of the inertial measurement device 100. Accordingly, when it is determined that the inertial measurement device 100 is abnormal, the inertial measurement device 100 can continue the measurement while outputting the measurement value for which a certain level of reliability is ensured.

The amplitude ratio calculation circuit 434 compares the amplitude A1 of the measurement data D1 with the amplitude A2 of the measurement data D2 and outputs, to the storage circuit 19, sensor selection information that is information indicating the normal inertial sensor among the first inertial sensor 301 and the second inertial sensor 302. Specifically, when the amplitude A1 is larger than the amplitude A2, the sensor selection information is information indicating the first inertial sensor 301, and when the amplitude A2 is larger than the amplitude A1, the sensor selection information is information indicating the second inertial sensor 302. The storage circuit 19 stores the sensor selection information output from the amplitude ratio calculation circuit 434.

When it is determined that the inertial measurement device 100 is normal as a result of the self-diagnosis of the inertial measurement device 100, the physical quantity calculation circuit 432 operates in the same manner as in the first embodiment. That is, the physical quantity calculation circuit 432 calculates the physical quantity based on the measurement data D1 of the first inertial sensor 301 and the measurement data D2 of the second inertial sensor 302. On the other hand, when it is determined that the inertial measurement device 100 is abnormal as the result of the self-diagnosis of the inertial measurement device 100, the physical quantity calculation circuit 432 calculates the physical quantity based on the measurement data of the normal inertial sensor among the first inertial sensor 301 and the second inertial sensor 302.

When it is determined that the inertial measurement device 100 is abnormal, first, the physical quantity calculation circuit 432 acquires the sensor selection information stored in the storage circuit 19 from the storage circuit 19. Next, the physical quantity calculation circuit 432 acquires measurement data of an inertial sensor indicated by the sensor selection information among the measurement data D1 of the first inertial sensor 301 and the measurement data D2 of the second inertial sensor 302. The physical quantity calculation circuit 432 calculates the physical quantity based on the acquired measurement data. Next, the physical quantity calculation circuit 432 transmits a calculated value of the calculated physical quantity to the control device 410 as the measurement value of the physical quantity measured by the inertial measurement device 100.

In this way, in the embodiment, when the amplitude ratio A1/A2 is not within the reference range, the processing circuit 18 adopts an output of an inertial sensor that outputs a larger amplitude among the first inertial sensor 301 and the second inertial sensor 302 as an output of the inertial measurement device 100. Specifically, when the amplitude ratio A1/A2 is not within the reference range, the processing circuit 18 adopts, as the measurement value of the physical quantity of the inertial measurement device 100, the calculated value of the physical quantity calculated based on the measurement data of the inertial sensor that outputs the larger amplitude among the first inertial sensor 301 and the second inertial sensor 302. Accordingly, when it is determined that the inertial measurement device 100 is abnormal, the inertial measurement device 100 can continue measurement by outputting the measurement value for which a certain level of reliability is ensured.

3. Third Embodiment

Figure 11:
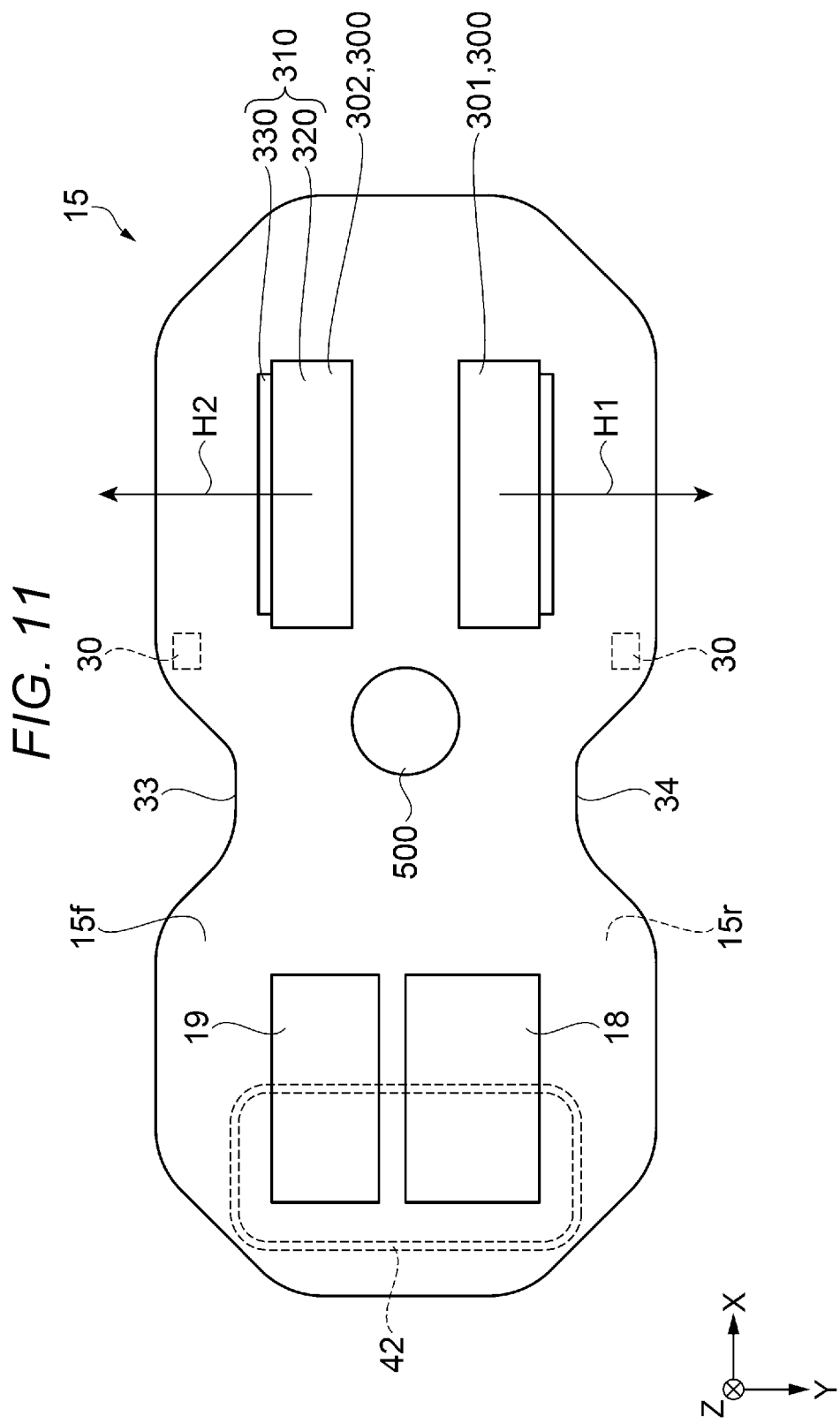
FIG. 11 is a plan view of a circuit board provided in an inertial measurement device according to a third embodiment.

Next, the inertial measurement device 100 and a self-diagnosis method of the inertial measurement device 100 according to a third embodiment will be described with reference to FIG. 11. The inertial measurement device 100 according to the third embodiment is the same as that of the first embodiment except that a vibration generator 500 is provided. The same components as those in the first embodiment are denoted by the same reference numerals, and description thereof will be omitted.

First, the inertial measurement device 100 according to the embodiment will be described. As shown in FIG. 11, in addition to the first inertial sensor 301, the second inertial sensor 302, the processing circuit 18, and the storage circuit 19, the vibration generator 500 serving as an actuator is further disposed on the first surface 15f of the circuit board 15 provided in the inertial measurement device 100 according to the embodiment.

The vibration generator 500 is electrically coupled to the processing circuit 18 via a wiring (not shown) or the like provided on the circuit board 15. In the embodiment, the vibration generator 500 is disposed in the vicinity of the first inertial sensor 301 and the second inertial sensor 302. The vibration generator 500 is disposed at equal distances from the first inertial sensor 301 and the second inertial sensor 302 in the plan view. However, disposition of the vibration generator 500 is not particularly limited. For example, the vibration generator 500 may be disposed on the second surface 15r of the circuit board 15 or may be disposed in the container 1 shown in FIG. 3.

When the vibration generator 500 is driven by a drive signal output from the processing circuit 18, the vibration generator 500 vibrates. The vibration generator 500 generates a motion including a component of the first detection axis H1 by vibration. In the embodiment, the component of the first detection axis H1 means a Y-axis component.

Since the vibration generator 500 generates the motion including the component of the first detection axis H1, an acceleration in the direction along the first detection axis H1 occurs on the inertial measurement device 100. Accordingly, the first inertial sensor 301 detects the acceleration on the first detection axis H1. The second inertial sensor 302 detects the acceleration on the second detection axis H2 defined in the direction opposite to the first detection axis H1.

In the inertial measurement device 100 disposed in a static environment such that the Z direction is along a gravity direction, the amplitude A1 of the measurement data D1 of the first inertial sensor 301 and the amplitude A2 of the measurement data D2 of the second inertial sensor 302 are zero if variations in the measurement data D1 and D2 caused by noises or the like are ignored. In this case, self-diagnosis of the inertial measurement device 100 cannot be performed based on the amplitude ratio A1/A2. The expression "acceleration is zero" refers to, in addition to a case where no acceleration substantially occurs, a case where, even if an acceleration in the direction along the first detection axis H1 occurs, the acceleration is less than a detection lower limit of the first inertial sensor 301 and the second inertial sensor 302.

In the embodiment, since the first inertial sensor 301 and the second inertial sensor 302 detect the acceleration in the direction along the first detection axis H1 occurring due to the motion of the vibration generator 500, the processing circuit 18 can perform the self-diagnosis of the inertial measurement device 100 based on the amplitude ratio A1/A2 even in a static environment. In other words, the processing circuit 18 executes the self-diagnosis of the inertial measurement device 100 by calculating the amplitude ratio A1/A2 based on the motion including the component of the first detection axis H1 generated by the vibration generator 500 that serves as an actuator. Accordingly, the processing circuit 18 can perform the self-diagnosis of the inertial measurement device 100 even in a static environment.

The vibration generator 500 is not particularly limited as long as the vibration generator 500 is a device that generates vibration. For example, various actuators such as an eccentric rotation mass type vibration motor, a voice coil type vibration motor, a vibration cylinder that drives a piston by hydraulic pressure or air pressure, and a piezoelectric motor can be used as the vibration generator 500.

In the embodiment, an eccentric rotation type disc-shaped vibration motor is used as the vibration generator 500. The vibration motor includes a rotation shaft (not shown) and an eccentric weight (not shown) attached to the rotation shaft. The rotation shaft of the vibration motor is disposed in a direction along the Z-axis direction which is the normal direction of the first surface 15f of the circuit board 15. The eccentric weight of the vibration motor rotates about the rotation shaft along the Z-axis. Accordingly, the vibration motor moves in a direction along the first surface 15f of the circuit board 15. That is, the vibration motor generates a motion including an X-axis component and a Y-axis component (the component of the first detection axis H1).

The processing circuit 18 may drive the vibration generator 500 as necessary. For example, whether the inertial measurement device 100 is in a static environment may be determined, and whether to drive the vibration generator 500 may be selected according to a determination result thereof. Specifically, the processing circuit 18 may drive the vibration generator 500 when the processing circuit 18 determines that the inertial measurement device 100 is in a static environment, and may not drive the vibration generator 500 when it is determined that the inertial measurement device 100 is not in a static environment.

An example of an operation by which the processing circuit 18 determines whether the inertial measurement device 100 is in a static environment will be described. For example, the processing circuit 18 can determine whether the inertial measurement device 100 is in a static environment by comparing a magnitude of the amplitude A1 of the measurement data D1 and a magnitude of the amplitude A2 of the measurement data D2 with a predetermined reference value stored in the storage circuit 19. The processing circuit 18 acquires the reference value from the storage circuit 19 and compares the reference value with the amplitude A1 and the amplitude A2. When both the amplitude A1 and the amplitude A2 are smaller than the reference value, the processing circuit 18 determines that the inertial measurement device 100 is in a static environment. When at least one of the amplitude A1 and the amplitude A2 is larger than the reference value, the processing circuit 18 determines that the inertial measurement device 100 is not in a static environment.

According to the embodiment, the following effects can be obtained in addition to the effects in the first embodiment. The inertial measurement device 100 further includes the vibration generator 500 that serves as an actuator, the vibration generator 500 generates the motion including the component of the first detection axis H1, and the processing circuit 18 executes the self-diagnosis of the inertial measurement device 100 based on the motion including the component of the first detection axis H1 generated by the vibration generator 500. Accordingly, for example, in a static environment, the processing circuit 18 can still perform the self-diagnosis of the inertial measurement device 100.

The inertial measurement device 100 has been described above based on the first embodiment to the third embodiment. However, the present disclosure is not limited thereto, and the configuration of each unit can be replaced with any configuration having the same function. In addition, any other components may be added to the present disclosure. In addition, the embodiments may be appropriately combined.

What is claimed is:
1. An inertial measurement device comprising:
a first inertial sensor having a first detection axis;

a second inertial sensor having a second detection axis defined in a direction opposite to the first detection axis; and a processing circuit configured to execute self-diagnosis based on whether a ratio of an amplitude of an output of the first inertial sensor to an amplitude of an output of the second inertial sensor is within a reference range.

2. The inertial measurement device according to claim 1, wherein, when the ratio is not within the reference range, the processing circuit adopts, as a device output, an output of one of the first inertial sensor and the second inertial sensor whose amplitude of the output is larger.

3. The inertial measurement device according to claim 1, further comprising:

an actuator configured to generate a motion including a component of the first detection axis, wherein the processing circuit executes self-diagnosis based on the motion generated by the actuator.

4. The inertial measurement device according to claim 1, further comprising:

a storage medium configured to store the reference range.

5. The inertial measurement device according to claim 1, wherein the first inertial sensor and the second inertial sensor are disposed on one surface of a board.

6. The inertial measurement device according to claim 1, wherein each of the first inertial sensor and the second inertial sensor is a frequency-variable type acceleration sensor.

7. A self-diagnosis method of an inertial measurement device including a first inertial sensor having a first detection axis, a second inertial sensor having a second detection axis defined in a direction opposite to the first detection axis, and a processing circuit configured to acquire an output of the first inertial sensor and an output of the second inertial sensor, wherein the processing circuit executes self-diagnosis based on whether a ratio of an amplitude of the output of the first inertial sensor to an amplitude of the output of the second inertial sensor is within a reference range.

\* \* \* \* \*